United States Patent
An et al.

(10) Patent No.: US 8,761,590 B2
(45) Date of Patent: Jun. 24, 2014

(54) MOBILE TERMINAL CAPABLE OF PROVIDING MULTIPLAYER GAME AND OPERATING METHOD THEREOF

(75) Inventors: Youngsoo An, Seoul (KR); Songrae Cho, Seoul (KR)

(73) Assignee: LG Electronics Inc., Seoul (KR)

(*) Notice: Subject to any disclaimer, the term of this patent is extended or adjusted under 35 U.S.C. 154(b) by 77 days.

(21) Appl. No.: 13/156,646

(22) Filed: Jun. 9, 2011

(65) Prior Publication Data

US 2011/0319131 A1 Dec. 29, 2011

(30) Foreign Application Priority Data

Jun. 25, 2010 (KR) ........................ 10-2010-0060770

(51) Int. Cl.
- *G02B 7/08* (2006.01)
- *G02B 7/10* (2006.01)
- *G03B 17/00* (2006.01)
- *G02B 15/173* (2006.01)

(52) U.S. Cl.
CPC ... *G02B 7/08* (2013.01); *G02B 7/10* (2013.01); *G02B 7/102* (2013.01); *G03B 17/00* (2013.01); *G02B 15/173* (2013.01)
USPC ............................................ 396/72; 709/217

(58) Field of Classification Search
CPC .................................. G02B 7/10; G02B 15/173
USPC ............. 345/239, 619, 633; 382/103; 396/72; 709/217
See application file for complete search history.

(56) References Cited

U.S. PATENT DOCUMENTS

| | | | |
|---|---|---|---|
| 2004/0131232 A1* | 7/2004 | Meisner et al. | 382/103 |
| 2004/0183926 A1* | 9/2004 | Fukuda et al. | 348/239 |
| 2008/0266323 A1* | 10/2008 | Biocca et al. | 345/633 |
| 2009/0102859 A1* | 4/2009 | Athsani et al. | 345/619 |
| 2009/0278948 A1 | 11/2009 | Hayashi | |
| 2009/0316951 A1* | 12/2009 | Soderstrom | 382/103 |
| 2010/0257252 A1* | 10/2010 | Dougherty et al. | 709/217 |
| 2011/0254861 A1* | 10/2011 | Emura et al. | 345/633 |
| 2011/0273473 A1* | 11/2011 | Kim | 345/629 |
| 2011/0273575 A1* | 11/2011 | Lee | 348/222.1 |
| 2011/0304648 A1* | 12/2011 | Kim et al. | 345/633 |
| 2011/0319130 A1* | 12/2011 | Lee et al. | 455/556.1 |
| 2012/0001938 A1* | 1/2012 | Sandberg | 345/633 |
| 2012/0001939 A1* | 1/2012 | Sandberg | 345/633 |
| 2012/0015672 A1* | 1/2012 | Jung | 455/456.3 |
| 2012/0026290 A1* | 2/2012 | Lim et al. | 348/46 |
| 2012/0038668 A1* | 2/2012 | Kim et al. | 345/633 |
| 2012/0044163 A1* | 2/2012 | Sim et al. | 345/173 |
| 2012/0050324 A1* | 3/2012 | Jeong et al. | 345/633 |
| 2012/0075341 A1* | 3/2012 | Sandberg | 345/633 |
| 2012/0154265 A1* | 6/2012 | Kim et al. | 345/156 |

FOREIGN PATENT DOCUMENTS

| | | | | |
|---|---|---|---|---|
| EP | 2385500 A2 * | 3/2011 | ............. | G06T 19/00 |
| GB | 2465280 A | 5/2010 | | |

* cited by examiner

*Primary Examiner* — Clayton E Laballe
*Assistant Examiner* — Kevin Butler
(74) *Attorney, Agent, or Firm* — Birch, Stewart, Kolasch & Birch, LLP

(57) ABSTRACT

A mobile terminal and an operating method thereof are provided. The mobile terminal includes displaying a preview image provided by a camera module on a display module; searching for object information of an object within a predetermined distance of the mobile terminal; and displaying the object information on the display module when a user command generated by pressing a predetermined key is received. Therefore, it is possible to provide object information with high readability by displaying the object information only when receiving a predetermined user command.

20 Claims, 13 Drawing Sheets

MOBILE TERMINAL CAPABLE OF PROVIDING MULTIPLAYER GAME AND OPERATING METHOD THEREOF

CROSS-REFERENCE TO RELATED APPLICATION

This application claims the priority benefit of Korean Patent Application No. 10-2010-0060770, filed on Jun. 25, 2010, in the Korean Intellectual Property Office, the disclosure of which is incorporated herein by reference.

BACKGROUND OF THE INVENTION

1. Field of the Invention

The present invention relates to a mobile terminal and an operating method thereof, and more particularly, to a mobile terminal capable of realizing augmented reality and an operating method of the mobile terminal.

2. Description of the Related Art

Mobile terminals are portable devices capable of performing voice/video calls, inputting and outputting information, and/or storing data. As the functions of mobile terminals diversify, an increasing number of mobile terminals have been equipped with various complicated functions, such as capturing photos and moving images, playing music files and moving image files, providing games, receiving broadcast programs, and providing wireless Internet services, and have thus evolved into multifunctional multimedia players.

Most mobile terminals are equipped with cameras and are thus being used to capture photos or videos. With the help of advanced mobile camera technology, various techniques, called augmented reality techniques, have been developed for providing a view of a physical real-world environment together with additional information regarding the real-world view.

Augmented reality is a term for the mixture of a view of a physical real world and additional information regarding the physical real world. Augmented reality techniques can allow users to easily obtain information regarding their surroundings with an enhanced sense of reality.

A method is needed to effectively provide a variety of useful information to users through augmented reality.

SUMMARY OF THE INVENTION

The present invention provides realizing augmented reality, and particularly, a mobile terminal capable of providing object information in various manners based on the current location of a user so as to improve user convenience and an operating method of the mobile terminal.

According to an aspect of the present invention, there is provided an operating method of a mobile terminal, the operating method including displaying a preview image provided by a camera module on a display module; searching for object information of an object within a predetermined distance of the mobile terminal; and displaying the object information on the display module when a user command generated by pressing a predetermined key is received.

According to another aspect of the present invention, there is provided a mobile terminal including a camera module; a display module; a user input unit configured to include a predetermined key; and a controller configured to receive a user command generated by pressing the predetermined key from the user input unit and display, during the receipt of the user command, a preview image provided by the camera module and object information of an object within a predetermined distance of the mobile terminal on the display module.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), a navigation device, a tablet computer or an electronic-book (e-book) reader. In this disclosure, the terms 'module' and 'unit' can be used interchangeably.

Figure 1:
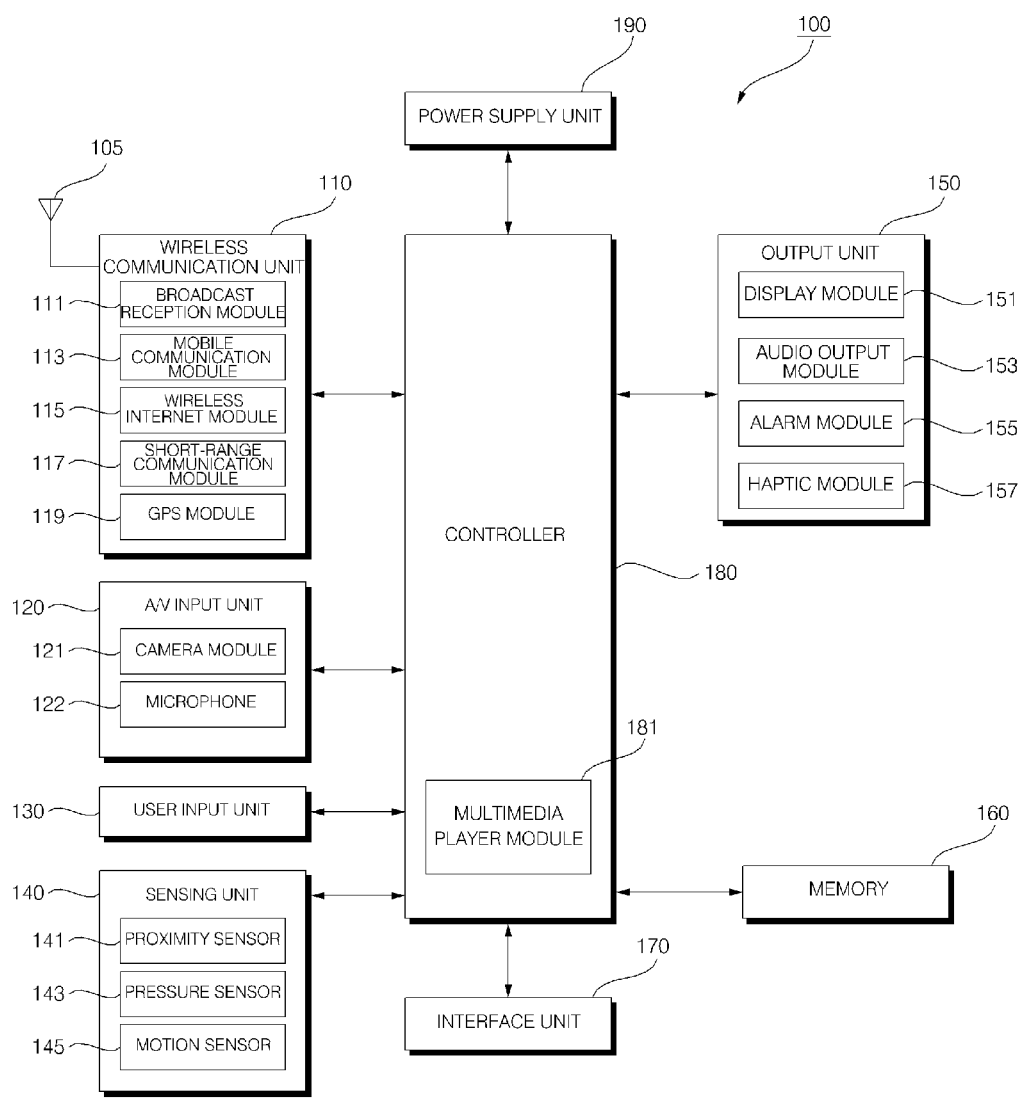
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Here, when the above constituent elements are implemented, two or more of the constituent elements may be combined into one constituent element, or one constituent element may be divided into two or more constituent elements, if appropriate.

The wireless communication unit 110 may include a broadcast reception module 111, a mobile communication module 113, a wireless internet module 115, a short-range communication module 117, and a global positioning system (GPS) module 119.

The broadcast reception module 111 may receive broadcast signals and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signals may include a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111.

The broadcast reception module 111 may receive broadcast signals using various broadcasting systems. In particular, the broadcast reception module 111 may receive digital broadcast signals using various digital broadcasting systems. In addition, the broadcast reception module 111 may be suitable not only for digital broadcasting systems but also for nearly all types of broadcasting systems other than digital broadcasting systems. The broadcast signal or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive location information from a plurality of GPS satellites.

The A/V input unit 120 may be used to receive audio signals or video signals. The A/V input unit 120 may include a camera module 121 and a microphone 123. The camera module 121 may process various image frames such as still images or moving images captured by an image sensor during a video call mode or an image capturing mode. The image frames processed by the camera module 121 may be displayed by a display module 151.

The image frames processed by the camera module 121 may be stored in the memory 160 or may be transmitted to an external device through the wireless communication unit 110. The mobile terminal 100 may include two or more cameras 121.

The microphone 123 may receive external audio signals during a call mode, a recording mode, or a voice recognition mode and may convert the received sound signals into electrical audio data. During the call mode, the mobile communication module 113 may convert the electrical sound data into data that can be readily transmitted to a mobile communication base station, and may then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, or a static pressure or capacitive touch pad which is capable of receiving a command or information by being pushed or touched by a user. Alternatively, the user input unit 130 may be implemented as a wheel, a jog dial or wheel, or a joystick capable of receiving a command or information by being rotated. Still alternatively, the user input unit 130 may be implemented as a finger mouse. In particular, if the user input unit 130 is implemented as a touch pad and forms a mutual layer structure with the display module 151, the user input unit 130 and the display module 151 may be collectively referred to as a touch screen.

The sensing unit 140 may determine a current state of the mobile terminal 100 such as whether the mobile terminal 100 is opened or closed, the location of the mobile terminal 100 and whether the mobile terminal 100 is placed in contact with the user, and may generate a sensing signal for controlling the operation of the mobile terminal 100. For example, when the mobile terminal 100 is a slider-type mobile phone, the sensing unit 140 may determine whether the mobile terminal 100 is opened or closed. In addition, the sensing unit 140 may determine whether the mobile terminal 100 is powered by the power supply unit 190 and whether the interface unit 170 is connected to an external device.

The sensing unit 140 may include a proximity sensor 141, a pressure sensor 143 and a gyro-sensor 142. The proximity sensor 141 may detect an approaching object or whether there is an object nearby the mobile terminal 100 without mechanical contact. More specifically, the proximity sensor 141 may detect an approaching object based on a change in an alternating current (AC) magnetic field or a static magnetic field, or the rate of change of capacitance. The sensing unit 140 may include two or more detection sensors 141.

The pressure sensor 143 may determine whether pressure is being applied to the mobile terminal 100 or may measure the magnitude of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated by applying greater pressure than that used to generate a typical touch input, based on a signal output by the pressure sensor 143. In addition, it is possible to determine the magnitude of pressure applied to the display module 151 upon receiving a pressure touch input based on the signal output by the pressure sensor 143.

The gyro-sensor 142 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, two or more acceleration sensors representing different axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UT or a GUI for capturing or receiving images.

If the display module 151 and the user input unit 130 form a mutual layer structure and are thus implemented as a touch screen, the display module 151 may be used not only as an output device but also as an input device capable of receiving information by being touched by the user.

If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving an incoming call or message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a list of contacts, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior structure of the mobile terminal 100 will hereinafter be described in detail with reference to FIGS. 2 and 3. The present invention can be applied to nearly all types of mobile terminals such as a folder-type, a bar-type, a swing-type and a slider-type mobile terminal. However, for convenience, it is assumed that the mobile terminal 100 is a bar-type mobile terminal equipped with a full touch screen.

Figure 2:
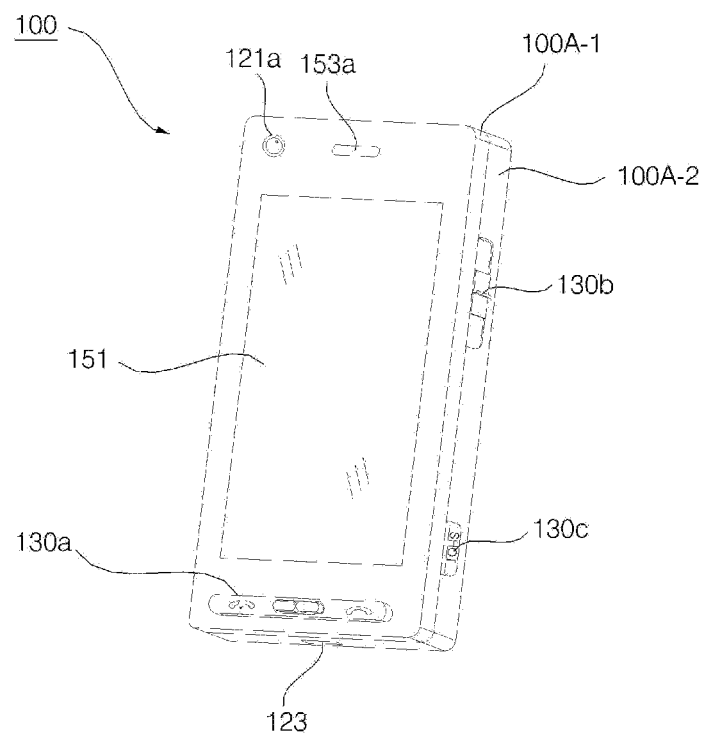
FIG. 2 illustrates a front perspective view of the mobile terminal shown in FIG. 1.

FIG. 2 illustrates a front perspective view of the mobile terminal 100. Referring to FIG. 2, the exterior of the mobile terminal 100 may be formed by a front case 100A-1 and a rear case 100A-2. Various electronic devices may be installed in the space formed by the front case 100A-1 and the rear case 100A-2. At least one middle case (not shown) may be additionally provided between the front case 100A-1 and the rear case 100A-2. The front case 100A-1, the rear case 100A-2 and the middle case(s) may be formed of a synthetic resin through injection molding. Alternatively, the front case 100A-1 and the rear case 100A-2 may be formed of a metal such as stainless steel (STS) or titanium (Ti).

The display module 151, a first audio output module 153a, a first camera 121a, and a first user input module 130a may be disposed in the main body of the mobile terminal 100, and particularly, in the front case 100A-1. Second and third user input modules 130b and 130c and the microphone 123 may be disposed on one side of the rear case 100A-2.

The display module 151 may include an LCD or OLED that can visualize information. If a touch pad is configured to overlap the display module 151 and thus to form a mutual layer structure, the display module 151 may serve as a touch screen. Thus, the user can enter various information simply by touching the display module 151.

The first audio output module 153a may be implemented as a receiver or a speaker. The first camera 121a may be configured to be suitable for capturing a still or moving image of the user. The microphone 123 may be configured to properly receive the user's voice or other sounds.

The first through third user input modules 130a through 130c and fourth and fifth user input modules 130d and 130e may be collectively referred to as the user input unit 130. The user input unit 130 may adopt various tactile manners as long as it can offer tactile feedback to the user.

For example, the user input unit 130 may be implemented as a dome switch or touch pad capable of receiving a command or information by being pushed or touched by the user; or a wheel, a jog dial or wheel, or a joystick capable of receiving a command or information by being rotated. More specifically, the first user input module 130a may be used to enter various commands such as 'start', 'end', and 'scroll' to the mobile terminal 100, the second user input module 130b may be used to select an operating mode for the mobile terminal 100, and the third user input module 130c may serve as a hot key for activating certain functions of the mobile terminal 100.

When the display module 151 is approached by the user's finger, the proximity sensor 141 may detect the existence of the approaching finger, and may output a proximity signal. The proximity sensor 141 may output different proximity signals according to the distance between the display module 151 and the approaching finger. For a precise detection of the approaching finger, a plurality of proximity sensors 141 having different detection ranges may be employed. In this case, it is possible to precisely determine the distance between the approaching finger and the display module 151 by comparing a plurality of proximity signals respectively provided by the plurality of proximity sensors 141. In addition, it is possible to determine which part of the display module 151 is being approached by the approaching finger and whether the approaching finger is being moved within the close vicinity of the display module 15 by determining which of the plurality of proximity sensors 141 are outputting proximity signals. The controller 180 may identify a touch key, if any, currently being approached by the approaching finger and may then control the haptic module 157 to generate a vibration signal corresponding to the identified touch key.

When the user tilts or shakes the mobile terminal 100, the gyro-sensor 142 may detect the movement of the mobile terminal 100, and may generate a signal corresponding to the detected movement to the controller 180. The controller 180 may extract various motion information such as the direction, angle, speed and intensity of the movement of the mobile terminal 100 and the location of the mobile terminal 100 from the signal provided by the gyro-sensor 142.

The controller 180 may keep track of the movement of the mobile terminal 100 based on the extracted motion information. The type of motion information that can be extracted from the signal provided by the gyro-sensor 142 may vary according to the type of gyro-sensor 142. Thus, more than one gyro-sensor 142 capable of providing desired motion information may be employed in the mobile terminal 100. The controller 180 may control the gyro-sensor 142 to operate only when a predetermined application is executed.

Figure 3:
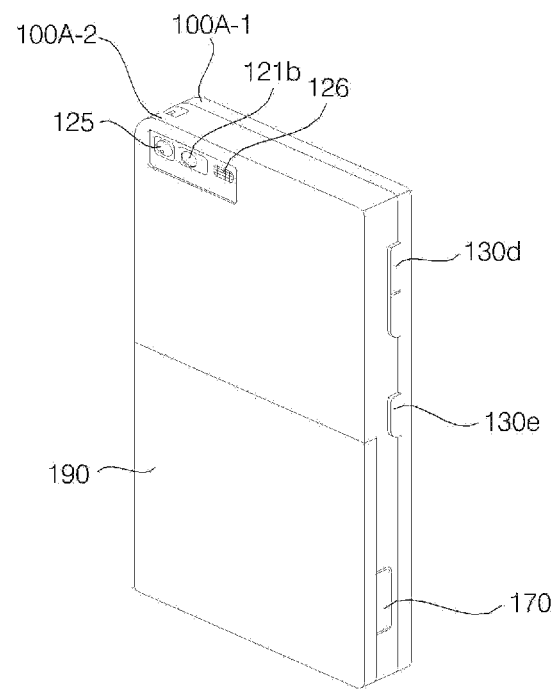
FIG. 3 illustrates a rear perspective view of the mobile terminal shown in FIG. 2.

FIG. 3 illustrates a rear perspective view of the mobile terminal 100. Referring to FIG. 3, the fourth and fifth user input modules 130d and 130e and the interface unit 170 may be disposed on one side of the rear case 100A-2, and a second camera 121b may be disposed at the back of the rear case 100A-2.

The second camera 121b may have a different photographing direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

A mirror 125 and a camera flash 126 may be disposed near the second camera 121b. The mirror 125 may be used for the user to prepare him- or herself for taking a self-portrait. The cameral flash 126 may be used to illuminate a subject when the user attempts to capture an image of the subject with the second camera 121b.

A second audio output module (not shown) may be additionally provided in the rear case 100A-2. The second audio output module may realize a stereo function along with the first audio output module 153a. The second audio output module may also be used in a speaker-phone mode.

Not only an antenna (not shown) for making or receiving a call but also an antenna (not shown) for receiving a broadcast signal may be disposed on one side of the rear case 100A-2. The antennas may be installed so as to be able to be retracted from the rear case 100A-2.

The interface unit 170 may serve as a pathway for allowing the mobile terminal 100 to exchange data with an external device. For example, the interface unit 170 may include at least one of a connector for connecting earphones to the mobile terminal wiredly or wirelessly, a port for performing short-range communication, and a power supply port for supplying power to the mobile terminal 100. Alternatively, the interface unit 170 may include a card socket for receiving a SIM card, a UIM card or an exterior card such as a memory card.

The power supply unit 190, which supplies power to the mobile terminal 100, may be disposed in the rear case 100A-2. The power supply unit may be a rechargeable battery and may be coupled to the rear case 100A-2 so as to be attachable to or detachable from the rear case 100A-2.

The second camera 121b and the other elements that have been described as being provided in the rear case 100A-2 may be provided in the front case 100A-1. In addition, the first camera 121a may be configured to be rotatable and thus to cover the photographing direction of the second camera 121b. In this case, the second camera 121b may be optional.

Figure 4:
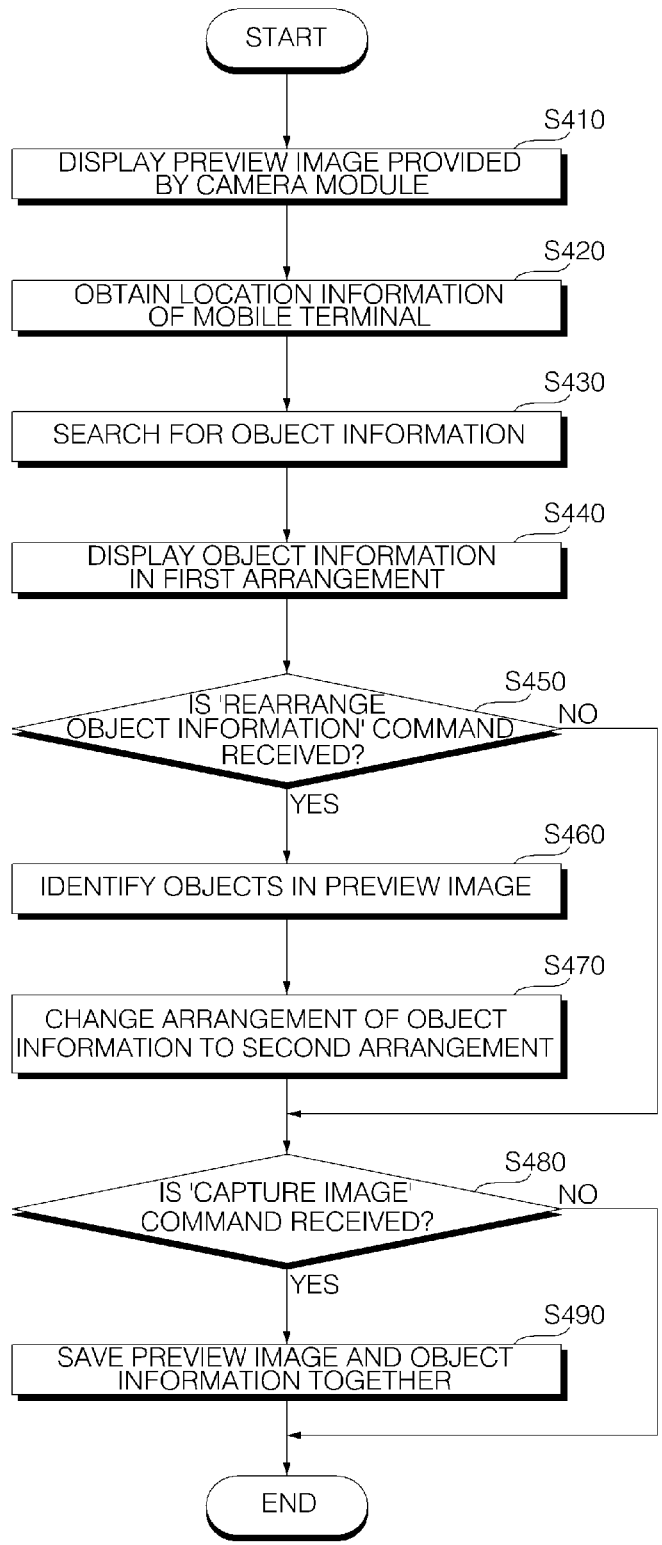
FIG. 4 illustrates a flowchart of an operating method of a mobile terminal according to an exemplary embodiment of the present invention, and particularly, how to change the arrangement of object information according to the circumstances of a mobile terminal.

FIG. 4 illustrates a flowchart of an operating method of a mobile terminal according to an exemplary embodiment of the present invention, and particularly, how to change the arrangement of object information according to the circumstances of the mobile terminal 100. Referring to FIG. 4, in an augmented reality mode, a preview image provided by the camera module 121 may be displayed on the display module 151 (S410). More specifically, if the user selects the augmented reality mode with reference to, for example, the manual of the mobile terminal 100, the preview image, which is a preview of an image to be captured by the camera module 121, may be displayed on the display module 151. The augmented reality mode is a mode for providing a view of a physical real world and information regarding the physical real world.

Thereafter, the controller 180 may obtain location information of the mobile terminal 100 (S420). More specifically, the controller 180 may obtain the location information of the mobile terminal 100 from, for example, the GPS module 119. Since the camera module 121 is incorporated into the mobile terminal 100, the location information of the mobile terminal 100 may be considered to be the same as location information of the camera module 121.

GPS information of the mobile terminal 100 may be obtained as the location information of the mobile terminal 100, but the present invention is not restricted to this. That is, the controller 180 may obtain the location information of the mobile terminal 100 using various other methods than using the GPS module 119, for example, using Assisted GPS (A-GPS), which is a system using assistance data available from a network, using a global satellite navigation system such as Galileo or Glonass, using a Wireless Fidelity (Wi-Fi) positioning system (WPS), using cell identification (ID), which is a mobile positioning method using the cell ID of a base station where a mobile terminal bearer belongs, using Bluetooth, and using radio frequency identification (RFID).

If the mobile terminal 100 is located in an outdoor environment, the location information of the mobile terminal 100 can be obtained using the GPS module 119. On the other hand, if the mobile terminal 100 is located in an indoor environment, the location information of the mobile terminal 100 can be obtained using the wireless internet module 115 or the short-range communication module 117.

Thereafter, the controller 180 may search for object information based on the location information of the mobile terminal 100 (S430). The object information may be information regarding an object within a predetermined distance of the mobile terminal 100, and may include text information, link information, image information and audio information regarding the object. If the object is a building, the object information may include information specifying services that can be provided in the building, (for example, information specifying what the building houses). If the object is an album, the object information may include information specifying shopping malls that sell the music album, a synopsis of the album, and a preview of the album.

The controller 180 may search for object information from an object information database. The object information database may be provided in advance in the memory 160 of the mobile terminal 100. However, if no object information database is provided in the memory 160 of the mobile terminal 100, the controller 180 may access an external device having an object information database, and may thus use the object information database of the external device. In the object information database of the mobile terminal 100, each object information may be stored in association with corresponding object position information.

The controller 180 may display the found object information in a display region on the display module 151 over the preview image in a first arrangement (S440). More specifically, the found object information may be displayed on a certain part of the display region, for example, on one side of the display region. If there are two or more pieces of object information found, the pieces of object information may be classified into one or more category groups, and a number of pieces of object information included in each of the category groups may be displayed in alphabetical order. If the found object information identifies more than one object, the found object information may be displayed only once, and an indicator of the number of objects identified by the found object information may be additionally displayed.

The arrangement of the object information on the preview image may not change until the position of the mobile terminal 100 changes. That is, the arrangement of the object information on the preview image may be uniformly maintained regardless of the change of subjects in the preview image as long as the position of the mobile terminal 100 is fixed. Therefore, it is possible to cause less eye fatigue for the user.

The controller 180 may determine whether a 'Rearrange Object Information' command has been received (S450). In order to determine the relative positions of objects identified by the found object information, the user may enter the 'Rearrange Object Information' command simply by half-pressing a shutter key of the mobile terminal 100.

If it is determined in operation S450 that the 'Rearrange Object Information' command has been received, the controller 180 may perform shape recognition on the preview image (S460).

Shape recognition is a method of detecting the shape of an object that can be classified into a predefined model class from a preview image and restoring geometric information of the detected shape. Various shape recognition techniques such as control point detection or shape rendering can be used in operation S435, but the present invention is not restricted to this.

The controller 180 may identify one or more objects from the preview image based on the results of shape recognition performed in operation S460 and the location information of the mobile terminal 100. Not all objects in the preview image may be valid. Only objects whose object information is present in the object information database of the mobile terminal 100 may be valid. Therefore, the controller 180 may identify only valid objects from the preview image displayed in operation S460 based on the results of shape recognition performed in operation S460 and the location information of the mobile terminal 100.

Thereafter, the controller 180 may change the arrangement of the object information on the preview image from the first arrangement to a second arrangement in consideration of the positions of the identified objects (S470). The object information on the preview image may include more than one piece of information regarding objects within a predetermined distance of the mobile terminal 100, and not all the objects identified by the object information on the preview image may be shown in the preview image. Thus, the controller 180 may display object information near a corresponding object if the corresponding object is shown in the preview image. On the other hand, if the corresponding object is not shown in the preview image, the controller 180 may display the object information in an area on the display module 151 corresponding to the location of the corresponding object. For example, the controller 180 may display object information of an object that is located on the right side of the subject(s) of the preview image on the right side of the display region of the display module 151, and may display object information of an object that is located on the left side of the subject(s) of the preview image on the left side of the display region of the display module 151. In addition, the controller 180 may display object information of an object that is overlapped by the subject(s) of the preview image and is thus not shown in the corresponding preview image on the upper side of the display region of the display module 151, and may display object information of an object that is located on the opposite side of the viewing angle of the camera module 121 on the lower side of the display region of the display module 151.

Since a plurality of pieces of object information on the preview image can be rearranged in consideration of the relative positions of their respective objects to the subject(s) of the preview image, the user can intuitively identify the locations of the objects identified by the plurality of pieces of objects from how the plurality of pieces of object information are rearranged. If the user keeps changing the direction of the camera module 121 while half-pressing the shutter key of the mobile terminal 100, the arrangement of the plurality of pieces of object information may keep changing accordingly. Thus, the user can easily locate any desired object from the preview image.

Thereafter, the controller 180 may determine whether a 'Capture Image' command has been received (S480). The user may enter the 'Capture Image' command by fully pressing the shutter key of the mobile terminal 100. If it is determined in operation S480 that the 'Capture Image' command has been received, the controller 180 may capture the preview image and may save the captured image and the object information on the preview image (S490).

More specifically, the controller 180 may save a captured image of a display screen of the display module 151 showing both the preview image and the object information on the preview image. Alternatively, the controller 180 may save the preview image and the object information on the preview image as separate files. If the 'Capture Image' command is received before the receipt of the 'Rearrange Object Information' command, the controller 180 may combine the preview image and the object information in the first arrangement, and may save the result of the combination. On the other hand, if the 'Capture Image' command is received after the receipt of the 'Rearrange Object Information' command, i.e., if the shutter key of the mobile terminal is half-pressed and then fully-pressed, the controller 180 may combine the preview image and the object information in a second arrangement, and may save the result of the combination.

In this exemplary embodiment, the preview image and the object information on the preview image may be saved at the same time in response to the 'Capture Image' command, but the present invention is not restricted to this. That is, the preview image may be saved first in response to the 'Capture Image' command without a requirement of the receipt of the 'Rearrange Object Information' command. The preview image and the object information on the preview image may be saved at the same time only if the 'Capture Image' command is received after the receipt of the 'Rearrange Object Information' command.

Figure 5:
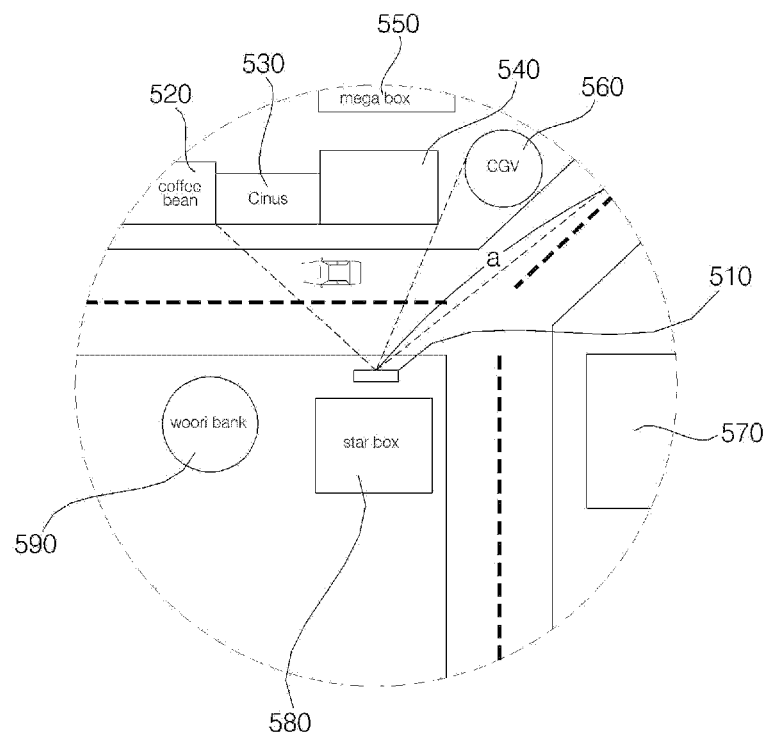
FIGS. 5 and 6 illustrate the relationship between objects, each having object information.
Figure 6:
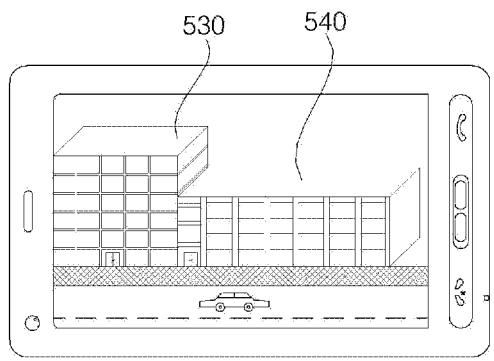

FIGS. 5 and 6 illustrate the relationship between objects, each having object information. Referring to FIG. 5, the mobile terminal 100 can obtain a plurality of pieces of object information of a plurality of objects 520 through 590 that are located within a predetermined distance a of the mobile terminal 100. At least some of the plurality of pieces of object information of the objects 520 through 590 may be stored in the object information database of the mobile terminal 100. The controller 180 may be configured to provide only the object information present in the object information database of the mobile terminal during an augmented reality mode.

Referring to FIGS. 5 and 6, when the objects 530 through 550 fall within the viewing angle of the camera module 121, only the objects 530 and 540 may be shown in a preview image provided by the camera module 121 because they directly face the camera module 121 without being overlapped by other objects. That is, objects (such as the objects 520 and 560 through 590) that are outside the viewing angle of the camera module 121 and objects (such as the object 550) that are overlapped by other objects may not be shown in a preview image. Therefore, the number of pieces of object information searched for from the object information database of the mobile terminal 100 may not necessarily be the same as the number of objects that are shown in a preview image. In general, the number of pieces of object information searched for from the object information database of the mobile terminal 100 may be greater than the number of objects that are shown in a preview image. If too many pieces of object information are displayed on a preview image, the preview image may be blocked from view, and thus, the user may not be able to properly view the preview image.

Figure 7:
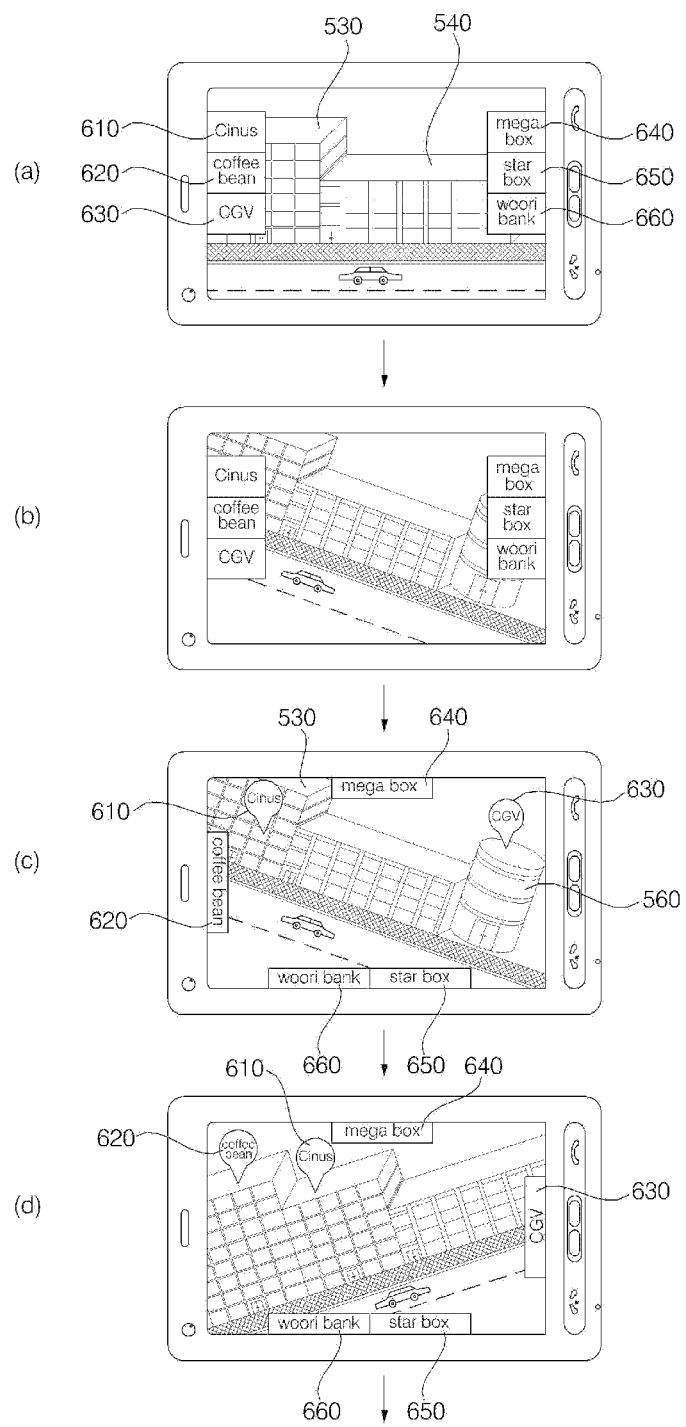
FIG. 7 illustrates an example of how to change the arrangement of object information.

FIG. 7 illustrates an embodiment of how to change the arrangement of object information. Referring to FIG. 7(a), in an augmented reality mode, the controller 180 may search for a plurality of pieces of object information 610 through 660 of a plurality of objects (i.e., the objects 520 through 570) that are located within a predetermined distance of the mobile terminal 100, and may display the plurality of pieces of object information 610 through 660 on either side of the display region of the display module 151. Then, the user can easily identify the objects 520 through 570 from the plurality of pieces of object information 610 through 660. The plurality of pieces of object information 610 through 660 may be displayed in alphabetical order, and thus, the user can easily identify the plurality of pieces of object information 610 through 660.

Referring to FIG. 7(b), even when the location of the mobile terminal 100 does not change, a preview image provided by the camera module 121 may change due to, for example, a slight movement of the user's hand holding the mobile terminal 100. However, even if the preview image changes, the plurality of pieces of object information 610 through 660 may stay where they are. Thus, the user can easily identify the plurality of pieces of object information 610 through 660 from the display module 151 regardless of a change or shake in the preview image.

The user may enter a 'Rearrange Object Information' command by half-pressing the shutter key of the mobile terminal 100. Then, referring to FIG. 7(c), the object information 610 and 630 may be displayed near their respective objects, i.e., the objects 530 and 560, because the objects 530 and 560 are shown in the preview image, whereas the object information 620 and 640 through 660 may be displayed on either side of the display region of the display module 151 or at the top or bottom of the display region of the display module 151.

More specifically, the object information 620 and 640 through 660 may be displayed on the display module 151 according to a set of rules. For example, the object information 640 corresponding to the object 550, which is overlapped by the subjects of the preview image, may be displayed at the top of the display region of the display module 151, the object information 620 corresponding to the object 520, which is located on the left side of the subjects of the preview image, may be displayed on the left side of the display region of the display module 151, and the object information 650 and 660 corresponding to the objects 580 and 590, respectively, which are located on the opposite side of the viewing angle of the camera module 121, may be displayed at the bottom of the display region of the display module 151.

The object information 610 and 630 corresponding to the objects 530 and 560, respectively, which are shown in the preview image, may be displayed differently from the other object information 620 and 640 through 660.

Referring to FIG. 7(d), if the user moves the moving terminal 100 while half-pressing the shutter key of the mobile terminal 100, the preview image may be changed to show a new object, i.e., the object 520, and the arrangement of the plurality of pieces of object information 610 through 660 may be changed accordingly.

More specifically, since the changed preview image shows the object 520, the object information 620 corresponding to the object 520 may be displayed near the object 520, instead of being displayed on one side of the display region of the display module 151, whereas the object information 630 corresponding to the object 560 that is still not shown in the changed preview image may be displayed on one side of the display region of the display module 151 in consideration of the relative position of the object 560 to the subjects of the changed preview image.

By changing the arrangement of object information, it is possible for the user to easily identify each object and the object information with convenience.

Referring to FIG. 7, object information may be displayed on one side of the display region of the display module 151, and the arrangement of the object information may be changed in consideration of the locations of the subject(s) of a preview image in response to a half-press on the shutter key of the mobile terminal 100. However, the present invention is not restricted to this. That is, object information may be displayed first in connection with the position of a corresponding object, and may be rearranged in response to a half-press on the shutter key of the mobile terminal 100 and may thus be moved to one side of the display region of the display module 151. In short, object information may be displayed on the display module 151 in various manners, other than those set forth herein.

Figure 8:
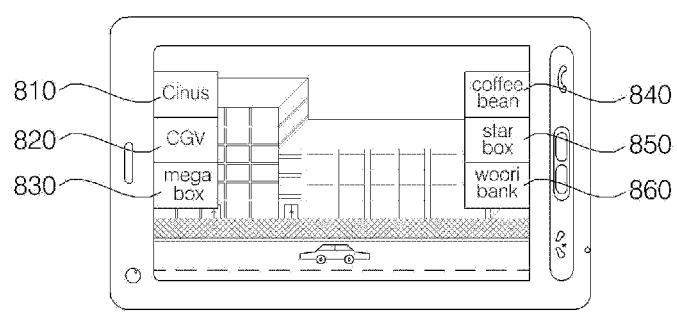
FIGS. 8 and 9 illustrate various examples of the arrangement of object information.
Figure 9:
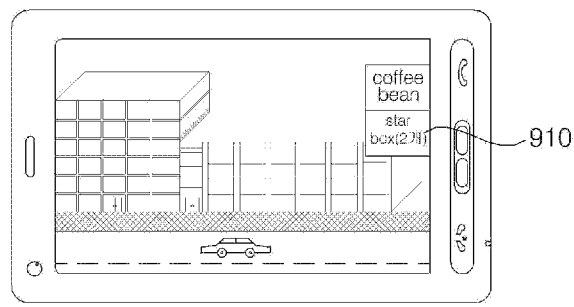

FIGS. 8 and 9 illustrate various examples of the arrangement of object information. If there is a plurality of pieces of object information found, the controller 180 may classify the plurality of pieces of object information into one or more category groups, and may display the plurality of pieces of object information in units of the category groups. For example, referring to FIG. 8, three pieces of object information 810, 820 and 830 classified into a 'theater' category may be displayed together on one side of the display region of the display module 151, and two pieces of object information 840 and 850 classified into a 'coffee shop' category may be displayed together on the other side of the display region of the display module 151.

Referring to FIG. 9, if there is more than one object having the same object information (i.e., object information 910) within a predetermined distance of the mobile terminal 100, an indicator of the number of objects having the object information 910 may be included in the object information 910. In this manner, it is possible to minimize the interference of object information with the visibility of a preview image by displaying any duplicate object information only once on the display module 151.

Referring to FIG. 9, object information may be displayed on one side of the display region of the display module 151, but the present invention is not restricted to this. That is, object information may be displayed anywhere else in the display region of the display module 151, for example, in the middle of the display module 151.

Referring to FIG. 9, object information of all objects located within a predetermined distance of the mobile terminal 100 may be displayed on the display module 151, but the present invention is not restricted to this. That is, object information of only objects that are shown in a preview image provided by the camera module 121 may be displayed on the display module 151. More specifically, if a 'Rearrange Object Information' command is received when object information of an object that is shown in a preview image is displayed on one side of the display region of the display module 151, the object information may be displayed near the corresponding object. The display of object information of an object that is shown in a preview image does not necessarily require the controller 180 to obtain location information of the mobile terminal 100 because an object that is shown in a preview image can be easily identified simply through shape recognition and its object information can be easily obtained using the results of the identification.

Referring to FIG. 9, the controller 180 may interpret a half-pressure on the shutter key of the mobile terminal 100 as a user 'Rearrange Object Information' command, but the present invention is not restricted to this. That is, the 'Rearrange Object Information' command may be entered by selecting an icon displayed on the display module 151 or selecting a menu item. A half-pressure on the shutter key of the mobile terminal 100 may be interpreted as various other user commands than the 'Rearrange Object Information' command.

Figure 10:
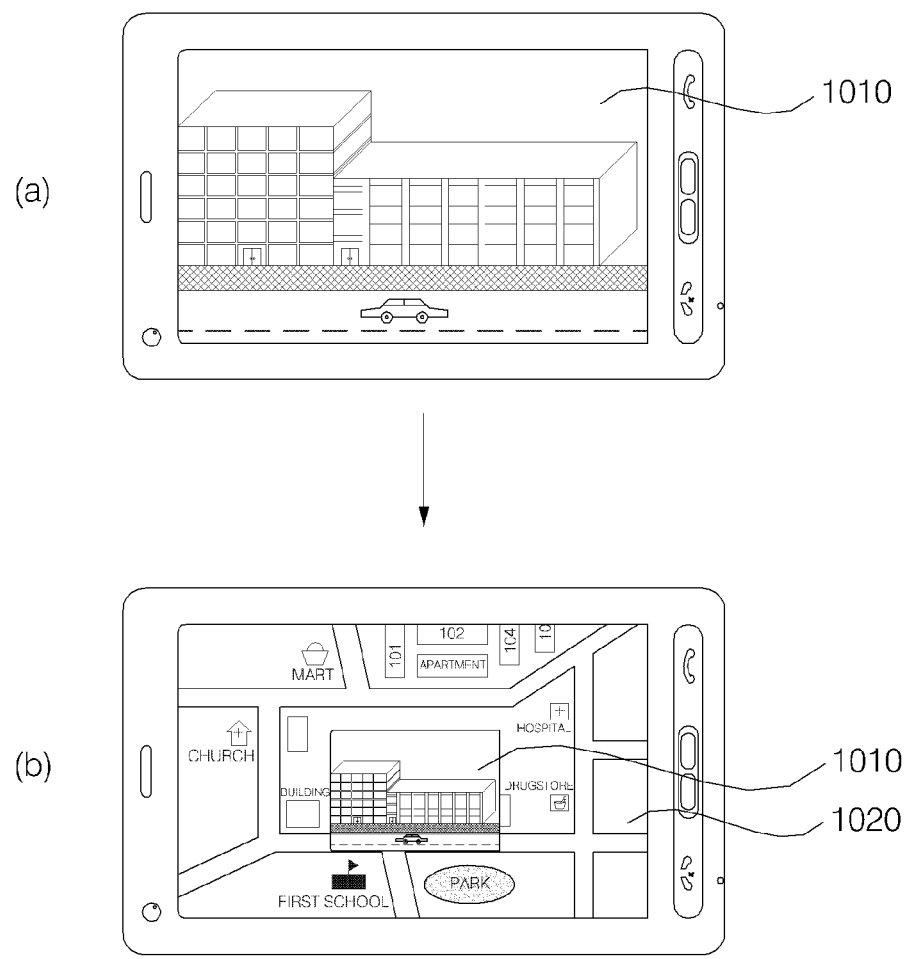
FIG. 10 illustrates an example of how to realize augmented reality in response to a half-press on a shutter key.

FIG. 10 illustrates an example of how to realize augmented reality in response to a half-press on the shutter key of the mobile terminal 100. Referring to FIGS. 10(*a*) and 10(*b*), if a user command such as a half-press on the shutter key of the mobile terminal 100 is detected when a preview image 1010 is displayed on the display module 151, the controller 180 may combine the preview image 1010 and a map 1020 of a region including the area shown in the preview image 1010 and may display the result of the combination on the display module 151. In this case, the preview image 1010 may be reduced to a predetermined scale, or may be displayed only partially.

Figure 11:
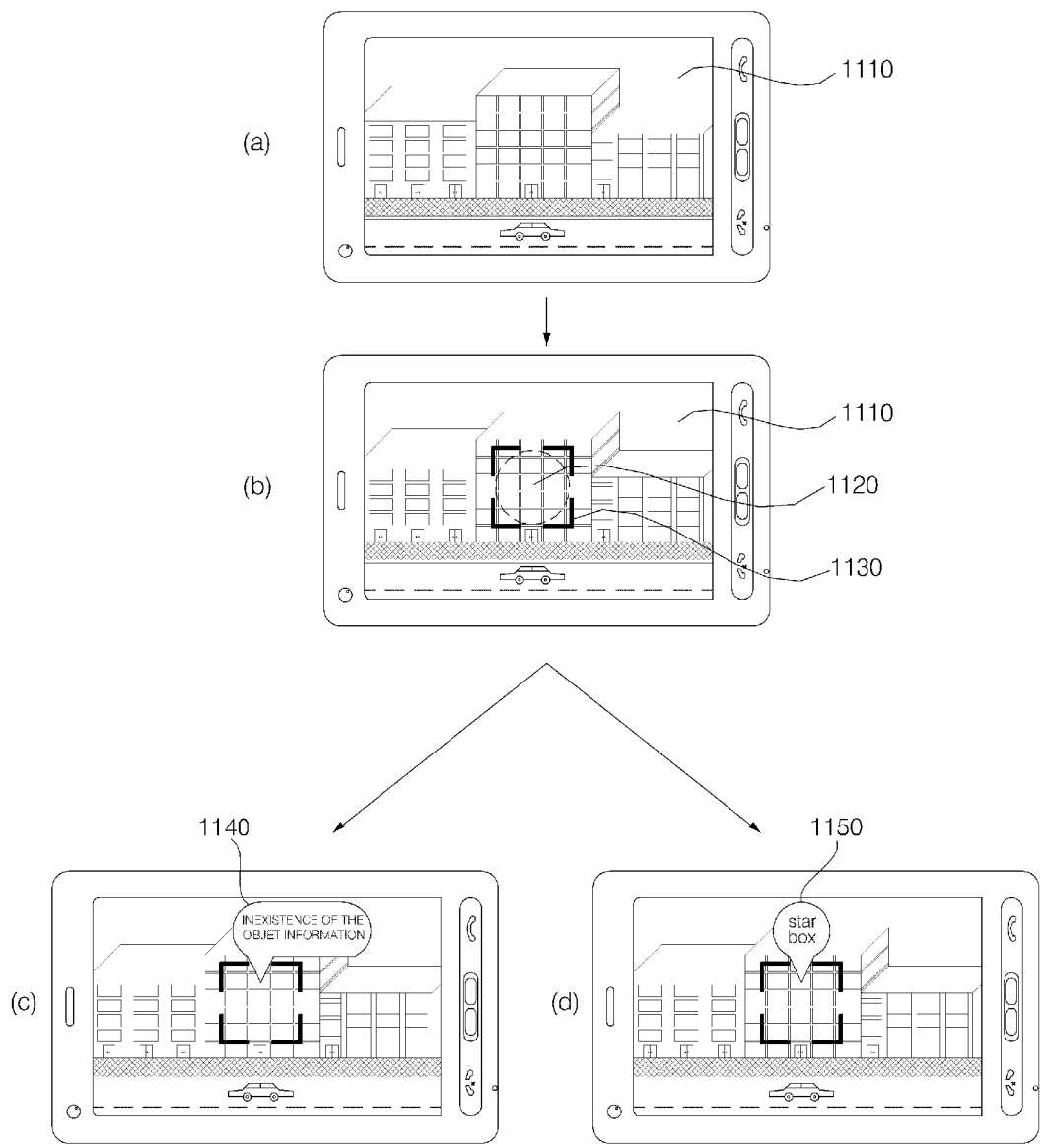
FIG. 11 illustrates another example of how to realize augmented reality in response to a half-press on a shutter key.

FIG. 11 illustrates another example of how to realize augmented reality in response to a half-press on the shutter key of the mobile terminal 100. Referring to FIGS. 11(*a*) and 11(*b*), if a user command such as a half-press on the shutter key of the mobile terminal 100 is detected when a preview image 1110 is displayed on the display module 151, the controller 180 may set one part 1110 of the preview image 1110 as a focus area, and may display a focus indicator 1130 near the focus area. Thereafter, the controller 180 may search the object information database of the memory 160 for object information 1150 of an object within the focus area. If the object information 1150 is not present in the object information database of the memory 160, the controller 180 may display an alert message indicating the inexistence of the object information 1150 in the object information database of the memory 160, as shown in FIG. 11(*c*). On the other hand, if the object information 1150 is not present in the object information database of the memory 160, the controller 180 may display the object information 1150 on the display module 151. Thereafter, if a 'Capture Image' command is received, the controller 180 may crop the object within the focus area out of the preview image 1110 and may save the cropped object together with the object information 1150.

The focus area may be changed or moved in response to a user command. More specifically, the user may change the size of the focus area or move the focus area by touching and dragging the focus area or the focus indicator 1130. The user can designate any desired objects by moving the focus area around on the preview image 1110.

In short, it is possible to maximize the use of the display region of the display module 151 by displaying only object information of one or more objects within a focus area set in a preview image.

Figure 12:
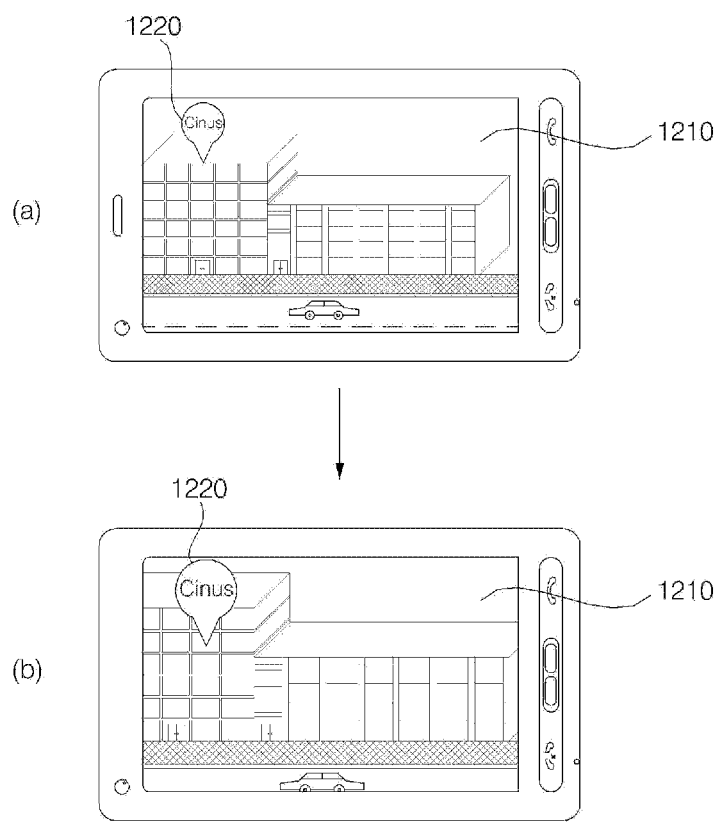
FIG. 12 illustrates another example of how to realize augmented reality in response to a half-press on a shutter key.

FIG. 12 illustrates another example of how to realize augmented reality in response to a half-press on the shutter key of the mobile terminal 100. Referring to FIGS. 12(*a*) and 12(*b*), if a user command such as a half-press on the shutter key of the mobile terminal 100 is detected when a preview image 1210 is displayed on the display module 151 and object information 1220 is displayed over the preview image 1210, the object information 1220 may be enlarged.

Figure 13:
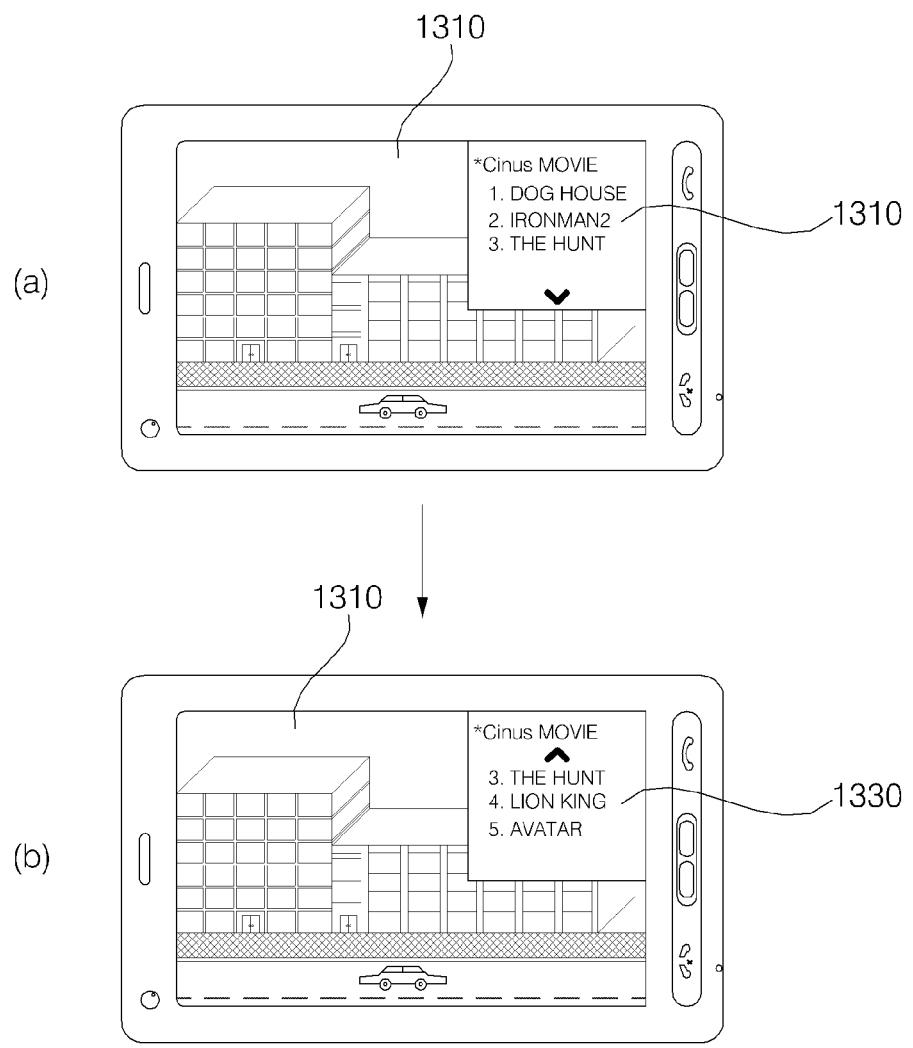
FIG. 13 illustrates another example of how to realize augmented reality in response to a half-press on a shutter key.

FIG. 13 illustrates another example of how to realize augmented reality in response to a half-press on the shutter key of the mobile terminal 100. Referring to FIG. 13(*a*), the controller 180 may display a preview image 1310 on the display module 151 and may display a portion 1320 of object information over the preview image 1310 if there is too much object information to be displayed on the display module 151 as a whole. Referring to FIG. 13(*b*), another portion 1330 of the object information may be displayed on the display module 151 a predefined amount of time after the display of the object information portion 1320. Thereafter, if a user command such as a half-press on the shutter key of the mobile terminal 100 is detected, the preview image 1310 and the object information portion 1330 on the preview image 1310 may be fixed so that they can never be changed regardless of a change in the position of the mobile terminal 100.

Figure 14:
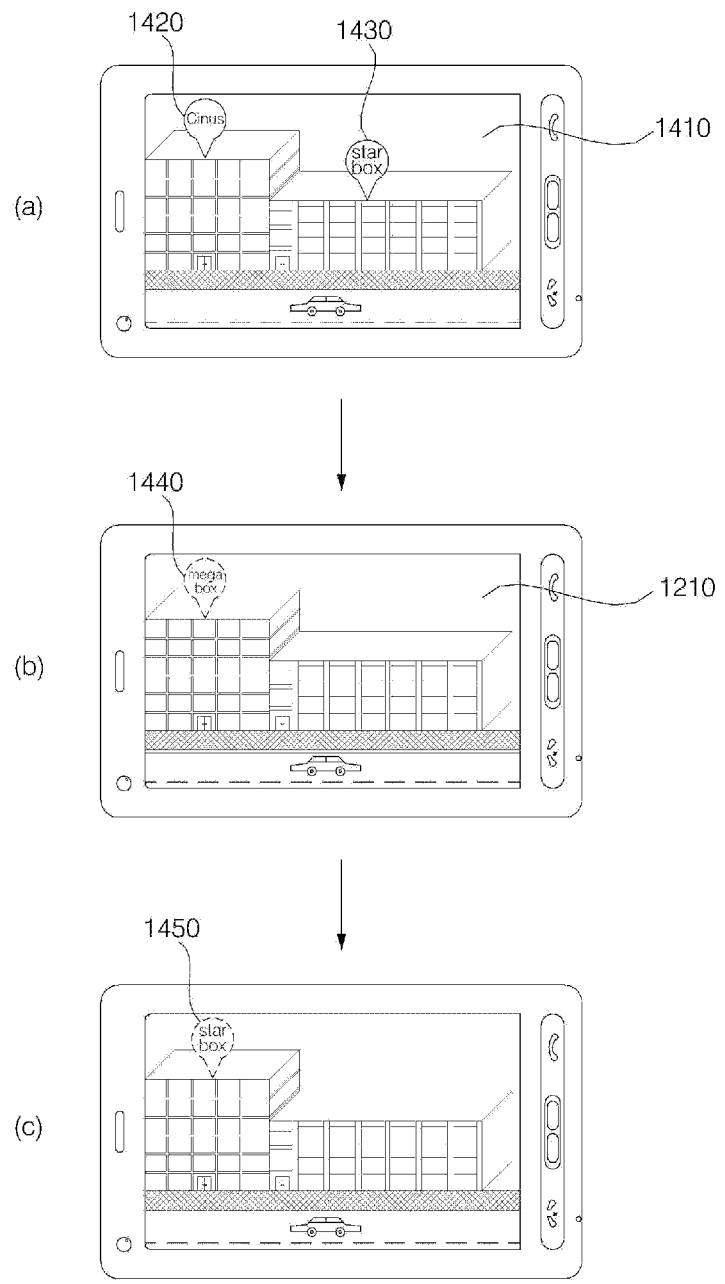
FIG. 14 illustrates another example of how to realize augmented reality in response to a half-press on a shutter key.

FIG. 14 illustrates another example of how to realize augmented reality in response to a half-press on the shutter key of the mobile terminal 100. Referring to FIGS. 14(*a*) and 14(*b*), if a half-press on the shutter key of the mobile terminal 100 is detected when object information 1420 and 1430 of objects that are located within a first distance of the mobile terminal 100 and are shown in a preview image 1410 is displayed, the controller 180 may display, instead of the object information 1420 and 1430, object information 1440 of an object that is located within the first distance of the mobile terminal 100 but is not shown in the preview image 1410 because of being overlapped by the subjects of the preview image 1410. The object information 1420 and 1430 may be marked with a solid line, whereas the object information 1440 may be marked with a dotted line. Referring to FIG. 14(*c*), a predefined amount of time after the detection of a half-press on the shutter key of the mobile terminal 100, the controller 180 may display, instead of the object information 1440, object information 1450 of an object that is further apart from the mobile terminal 100 than the objects identified by the object information 1420, 1430 and 1440 and is within a second distance of the mobile terminal 100. The object information 1450 may be displayed in a smaller size than the object information 1420, 1430 and 1440.

Referring to FIG. 14, a plurality of pieces of object information may be displayed one after another a predetermined amount of time after the detection of a half-press on the shutter key of the mobile terminal 100, but the present invention is not restricted to this. That is, a plurality of pieces of object information may be selectively displayed according to the depth to which the shutter key of the mobile terminal 100 is pressed. For example, if the shutter key of the mobile terminal 100 is pressed to a first depth, object information of an object shown in a preview image may be displayed on the display module 151. If the shutter key of the mobile terminal 100 is pressed to a second depth, object information of an object within a distance of 100 m of the mobile terminal 100 may be displayed on the display module 151. If the shutter key of the mobile terminal 100 is pressed to a third depth, object information of an object within a distance of 100 m to 200 m from the mobile terminal 100 may be displayed on the display module 151. If the shutter key of the mobile terminal 100 is pressed to a fourth depth, object information of an object within a distance of 200 m to 300 m from the mobile terminal 100 may be displayed on the display module 151. If the shutter key of the mobile terminal 100 is pressed to the first depth and then pressed fully, a preview image and object information displayed on the display module 151 at the time of pressing the shutter key of the mobile terminal 100 to the first depth may be combined, and the result of the combination may be saved.

Alternatively to the embodiments described above with reference to FIG. 14, if a user command such as a press on the shutter key of the mobile terminal 100 is detected when a preview image provided by the camera module 121 is displayed on the display module 151, object information may be displayed over the preview image until the corresponding shutter key is released. When the shutter key of the mobile terminal 100 is released, the object information may disappear from the display module 151 so that only the preview image can remain on the display module 151.

Figure 15:
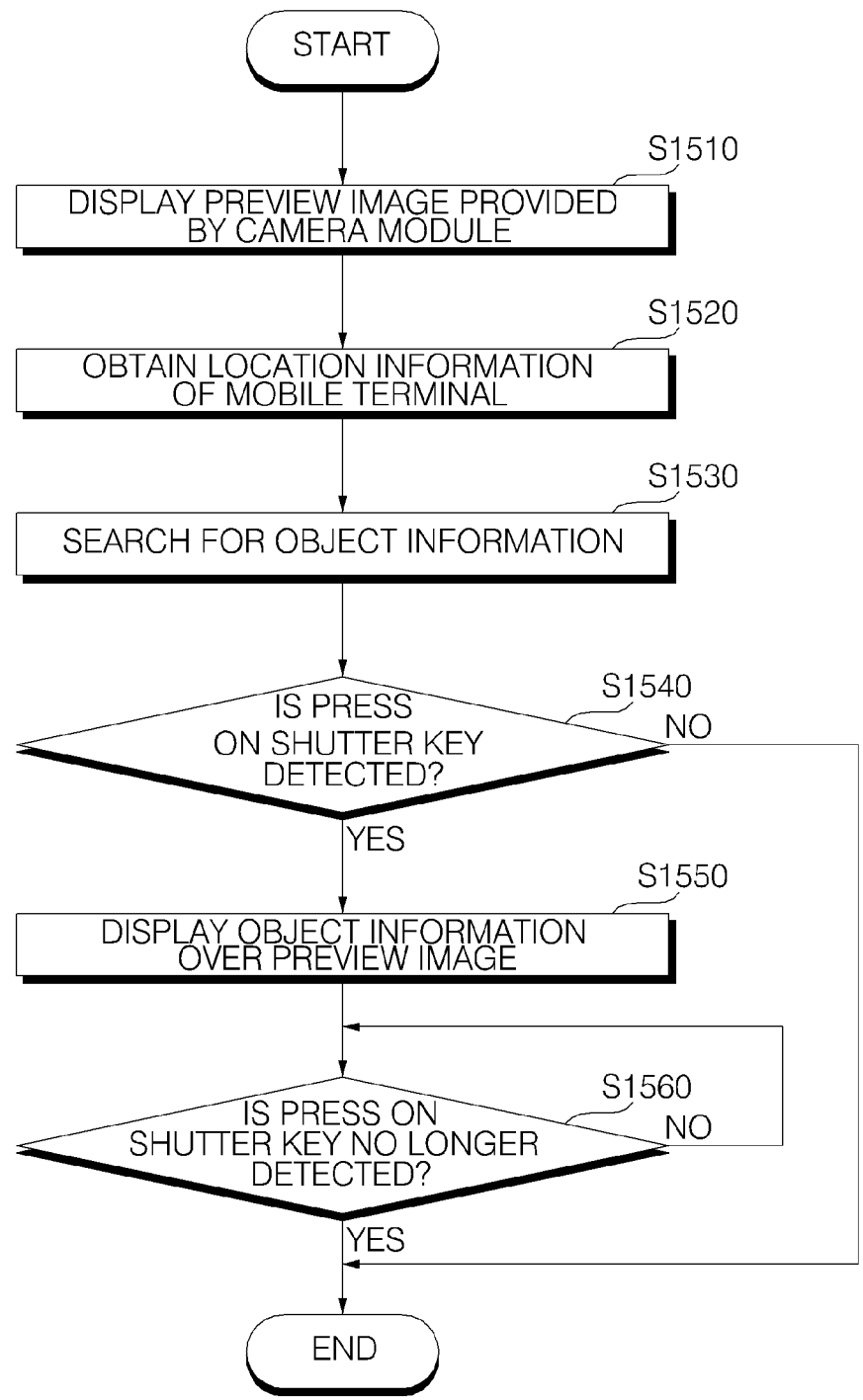
FIG. 15 illustrates a flowchart of an operating method of a mobile terminal according to another exemplary embodiment of the present invention, and particularly, how to display object information in response to a user command generated by pressing on a shutter key.

FIG. 15 illustrates a flowchart of an operating method of a mobile terminal, according to another exemplary embodiment of the present invention, and particularly, how to display object information in response to a user command such as a press on the shutter key of the mobile terminal 100. Referring to FIG. 15, a preview image provided by the camera module 121 may be displayed on the display module 151 (S1510). Thereafter, the controller 180 may obtain location information of the mobile terminal 100 (S1520), and may search for object information based on the location information of the mobile terminal 100 (S1530). Operations S1510 through S1530 are almost the same as their respective counterparts of FIG. 4, and thus, their detailed descriptions will be omitted.

Thereafter, the controller 180 may determine whether a user command such as a press on a predetermined key of the mobile terminal 100 is being received (S1540). The predetermined key may be a shutter key, but the present invention is not restricted to this. The user command may be a half-press on the predetermined key.

Thereafter, if it is determined in operation S1540 that the user command is being received, the controller 180 may display the found object information over the preview image until the user command is no longer detected (S1550). When the user command is no longer detected, the controller 180 may display a display screen displayed before the receipt of the user command back on the display module 151 (S1560). For example, if only the preview image had been displayed before the receipt of the user command, the controller 180 may terminate the display of the found object information and display only the preview image on the display module 151 when the user command is no longer detected.

In this exemplary embodiment, a preview image provided by the camera module 121 may be displayed before the receipt of a user command such as a press on the predetermined key, object information may be displayed over the preview image in response to the receipt of the user command, and only the preview image may be displayed after the receipt of the user command. However, the present invention is not restricted to this. That is, object information may also be displayed even when the user command is not received. In this case, the object information may be displayed in different manners in different situations. For example, before the receipt of the user command, the object information can be displayed, moving from one place to another on the display module 151. Once the user command is received, the object information may be displayed and fixed on a certain part of the display module 151 until the user command is no longer detected. Alternatively, before the receipt of the user command, the object information may be displayed in an area on the display module 151 corresponding to the location of a corresponding object. Then, if the user command is received, the object information may be displayed and fixed on one side of the display module 151. Still alternatively, before the receipt of the user command, the object information may be displayed and fixed on one side of the display module 151. Then, if the user command is received, the object information may be displayed in the area on the display module 151 corresponding to the location of the corresponding object. If the corresponding object is shown in a preview image, the area on the display module 151 corresponding to the location of the corresponding object may be an area on the display module 151 where the corresponding object is displayed. On the other hand, if the corresponding object is shown in a preview image, the area on the display module 151 corresponding to the location of the corresponding object may be an area on the display module 151 that shows a place closest to the location of the corresponding object.

The controller 180 may display object information in a first size before the receipt of a user command such as a half-press on the shutter key of the mobile terminal 100 and may display the object information in a second size, which is different from the first size, during the receipt of the user command. The second size may be greater than the first size. The controller 180 may also display different pieces of object information according to the degree to which the shutter key of the mobile terminal 100 is pressed. It has already been described above with reference to FIG. 14 how to display a variety of pieces of object information according to the depth to which the shutter key of the mobile terminal 100 is pressed, and thus, a detailed description thereof will be omitted.

If there are a plurality of pieces of object information, the controller 180 may display the plurality of pieces of object information one after another at regular intervals of time until a user command such as a half-press on the shutter key of the mobile terminal 100 is received. Then, if the user command is received, the controller 180 may display a piece of object information displayed at the time of the receipt of the user command on the display module 151 until the user command is no longer detected.

In short, it is possible to provide object information with high readability by displaying the object information only during the receipt of a user command such as a press on the shutter key of the mobile terminal 100 or varying the display state of the object information according to whether the user command is being received.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An operating method of a mobile terminal set in an augmented reality (AR) mode, the operating method comprising:

displaying a preview image provided by a camera module on a display module;

searching for object information of at least one object existing within a predetermined distance from a current location of the mobile terminal;

displaying the object information on a first area of the display module in a first arrangement;

receiving a user command generated by pressing a predetermined key;

identifying one or more objects included in the preview image upon receiving the user command; and changing an arrangement of the object information on the preview image from the first arrangement to a second arrangement based on a position of the identified objects while the user command is received.

2. The operating method of claim 1, wherein the predetermined key is a shutter key and the user command includes a half-press on the shutter key.

3. The operating method of claim 1, wherein the displaying the object information comprises displaying the object information in a predetermined area on the display module so as not to be moved around on the display module.

4. The operating method of claim 1, further comprising:
displaying the object information in a first size before receipt of the user command; and
displaying the object information in a second size, which is greater than the first size, during receipt of the user command.

5. The operating method of claim 1, further comprising:
setting at least one part of the preview image as a focus area and displaying a focus indicator representing the focus area on the display module; and
exclusively displaying object information of an object displayed within the focus area during receipt of the user command.

6. The operating method of claim 1, further comprising displaying different pieces of object information according to a depth to which the predetermined key is pressed.

7. The operating method of claim 1, further comprising:
if a first user command generated by pressing the predetermined key to a first depth is received, displaying object information of an object within a first distance of the mobile terminal; and
if a second user command generated by pressing the predetermined key to a second depth is received, displaying object information of an object more than the first distance apart from the mobile terminal.

8. The operating method of claim 1, further comprising:
dividing the object information into a plurality of segments and displaying the plurality of segments one after another at regular intervals of time; and
if the user command is received, displaying the segment displayed at the time of receipt of the user command until the user command is no longer received.

9. The operating method of claim 1, wherein the object information includes a map of a region where the at least one object is located.

10. The operating method of claim 1, further comprising:
re-displaying a screen image displayed before receiving the user command on the display module when receipt of the user command is terminated.

11. The operating method of claim 1, wherein the changing the arrangement comprises displaying the object information on a second area of the display module in the second arrangement during receipt of the user command.

12. The operating method of claim 11, wherein the first area is an area corresponding to the location of the at least one object and the second area is an area on a side of the display module.

13. The operating method of claim 11, wherein the first area is an area on a side of the display module and the second area is an area corresponding to the location of the at least one object.

14. A mobile terminal operating in an augmented reality (AR) mode comprising:
a camera module configured to capture images;
a display module configured to display a preview image provided by the camera module;
a user input unit configured to include a predetermined key; and
a controller configured to:
search for object information of at least one object existing within a predetermined distance from a current location of the mobile terminal;
display the object information on a first area of the display module in a first arrangement;
receive a user command generated by pressing the predetermined key;
identify one or more objects included in the preview image upon receiving the user command; and
change an arrangement of the object information on the preview image from the first arrangement to a second arrangement based on a position of the identified objects while the user command is received.

15. The mobile terminal of claim 14, wherein the predetermined key is a shutter key and the user command includes a half-press on the shutter key.

16. The mobile terminal of claim 14, wherein the controller displays the object information on a second area of the display module in the second arrangement during receipt of the user command.

17. The mobile terminal of claim 14, wherein the controller displays the object information in a first size before receipt of the user command and displays the object information in a second size, which is greater than the first size, during receipt of the user command.

18. The mobile terminal of claim 14, wherein the controller sets at least one part of the preview image as a focus area and displays a focus indicator representing the focus area on the display module, and exclusively displays an object information of an object displayed within the focus area during receipt of the user command.

19. The mobile terminal of claim 14, wherein the controller displays different pieces of object information according to a depth to which the predetermined key is pressed.

20. The mobile terminal of claim 14, wherein the controller re-displays a screen image displayed before receiving the user command on the display module when receipt of the user command is terminated.

* * * * *